Dec. 2, 1941.  W. EISSFELDT  2,264,367
APPARATUS FOR THE OPTICAL COMPENSATION OF THE WANDERING OF
A MOVED PICTURE CARRIER
Filed April 19, 1940
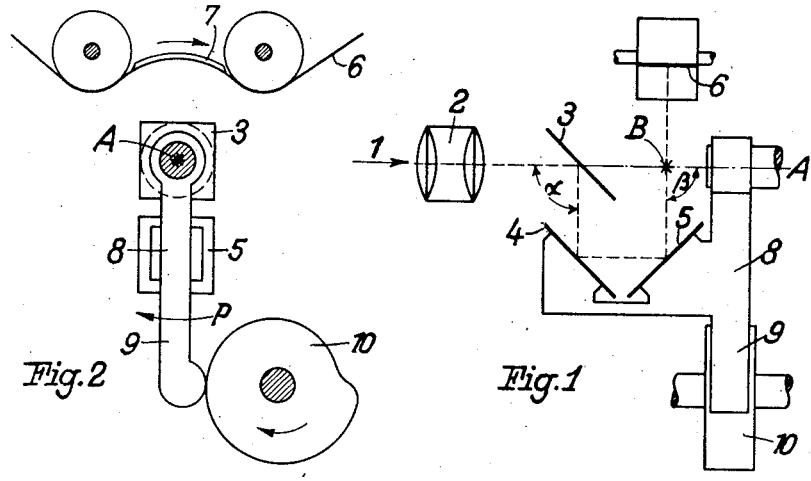
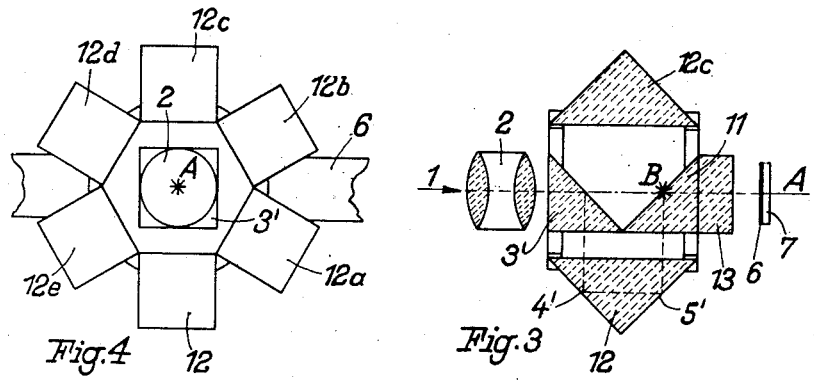
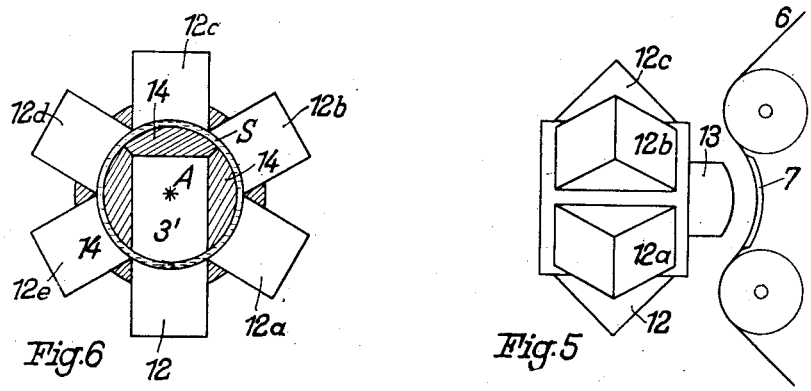
Inventor:
WERNER EISSFELDT
By
Attorney Patented Dec. 2, 1941

2,264,367

UNITED STATES PATENT OFFICE 2,264,367

APPARATUS FOR THE OPTICAL COMPENSATION OF THE WANDERING OF A MOVED PICTURE CARRIER

Werner Eissfeldt, Berlin-Wannsee, Germany, assignor to Tobis Tonbild-Syndikat Aktiengesellschaft, Berlin, Germany Application April 19, 1940, Serial No. 330,490
In Germany April 22, 1939

6 Claims. (Cl. 88—16.8)

In apparatus for the cinematographic photographing or reproduction, which in place of a picture carrier or film moved stepwise employ a uniformly moved picture carrier, either oscillating mirrors or revolving rings of mirrors are used for the optical compensation of the movement of the picture carrier, and the general opinion was that, by limitation to a single reflection, it may be possible to obtain especially short focal distances of the corresponding picture system.

The present invention is based on the thought, that with moved mirror systems, in which the ray path is diverted in a known manner perpendicularly to the optical axis and then a portion of it conducted parallel to the optical axis, in which therefore at least three reflections take place, optical systems of extremely short focal distance can be obtained, which give a perfect image, if the ray path is again conducted along the optical axis. This is attained according to the invention in that the said reflection faces are rotated about the optical axis of the lens and that the ray cone, viewed from the lens, is passed through a fixed reflecting element arranged behind the lens over these two reflecting faces and through a point of intersection with the said optical axis to the picture carrier mounted in its extension above this point of intersection, with an angular speed and direction of movement similar to that of the picture carrier also moving about this point of intersection.

The invention will be hereinafter explained with reference to the accompanying drawing, in which:

Fig. 1 shows in side view and
Fig. 2 in elevation an arrangement employing an oscillating mirror system,
Figs. 3 and 4 in similar views show an arrangement with a ring of revolving mirror prisms, and
Figs. 5 and 6 show in similar views an arrangement with a ring of reflecting prisms revolving in a space filled with liquid.

As can be seen from Figs. 1 and 2, the rays passing in the direction of the arrow 1 through a lens 2 are diverted by a mirror 3 by 90° and impinged upon the system of mirrors 4, 5. The system of mirrors 4, 5 is situated outside the optical axis A of the lens and oscillates about this optical axis in the direction of the arrow P. The mirrors 4 and 5 are arranged to the optical axis at similar angles, so that the main ray diverted under the angle $\alpha$ out of the optical axis intersects the optical axis at an angle $\beta$ at the point B, and the angles $\alpha$ or $\beta$ possess similar values. The mirrors 3, 4, 5 are preferably arranged each at 45° to the optical axis A, so that the angles $\alpha$ and $\beta$, as shown in Fig. 1, become both equal to 90°.

The film 6 is situated relative to the system of mirrors 4, 5 on the opposite side of the optical axis A and moves along an arc-shaped guide 7, the axis of the arc being situated in the optical axis A. For producing the oscillating movement the system of mirrors 4, 5 may be fixed on an arm 8 pivotably arranged about the optical axis A and to which, by means of a lever 9, tilting oscillations are imparted, said lever with this object in view sliding upon a cam 10. If cam 10 turns in the direction of the arrow, the system of mirrors 4, 5 is moved according to the movement of the film 6 uniformly pulled over the guide 7, until lever 9 drops into the step of the cam 10. At this moment the system of mirrors 4, 5 is suddenly tilted back in the direction opposite to the arrow P, to repeat its movement in the direction of the arrow P. The picture change results from the tilting back of the system of mirrors 4, 5.

Two inconveniences of the form of construction of the invention which is optically the simplest and diagrammatically illustrated in Figs. 1 and 2 are due to the fact that the unwinding of the film takes place perpendicularly to the optical axis and that an oscillating movement is required for the reflection faces 4, 5. According to the invention this arrangement can be transformed without difficulty into a "straight viewed" optical arrangement, as shown in Fig. 3, by arranging at the point (B) where the main ray meets the optical axis a further stationary reflection element 11. This additional reflection element 11 is then located between the moving reflection system 4, 5 and the picture carrier; and preferably deflects the ray path again back into the optical axis. The guide 7 for the film 6 forms then an arc of a circle, the center of which coincides with the point of intersection B, where the optical axis A passes through the reflecting face of the reflecting element 11.

By the directly viewed arrangement shown in Fig. 3 the necessary space is obtained so that the moving reflection system 4, 5 need no longer be of the oscillating type but can now revolve uniformly about the optical axis. Hence the advantage is obtained of a considerably more silent running and the possibility to employ considerably higher picture frequencies. To obtain a succession of pictures free from gaps, the reflection system 4, 5 is completed preferably by a number of similar reflection systems, which together form a ring revolving about the optical axis A. This will be explained hereinafter.

Whereas the reflection faces 3, 4, 5 in Figs. 1 and 2 are shown as mirrors, the reflection elements in the following illustrations are in the form of total reflecting or right angled isosceles prisms. The substitution of such prisms for mirrors is evidently known. It has also been frequently employed in compensator arrangements. In the present instance this measure has, however, the special technical advantage, that it is possible to cause the ray path of the compensation system to extend in glass almost over its whole length and consequently its geometrical length need optically be only about ⅔ of its value. This fact is important to enable the optical equalisation according to the invention with lenses having a comparatively short focal length and favorable aperture ratio.

As shown in Fig. 3 a totally reflecting prism 12 having faces 4' and 5' is substituted for the mirrors 4, 5. The compensator is preferably completed by a number of similar prisms 12b, 12c ... to a ring of prisms one mounted next to the other without intervening gaps, said ring rotating about the optical axis A. An arrangement of this type is shown in Fig. 3 in section and in Fig. 4 viewed in the direction of the arrow I. Fig. 5 shows the same arrangement in side elevation.

In the arrangement illustrated in Figs. 3 to 5 the picture projected by the lens 2 is conducted actually along the arc-shaped movement of the film 6 until it begins to move out of the picture window. The next following picture follows then immediately on this preceding picture. There is consequently no gradual overlapping as in the optical compensation according to Mechau. The operation of the optical compensation according to the invention corresponds approximately to that of an optical compensation by means of a prism wheel. A similar portion of the picture field of the next following picture enters therefore into the picture field with which the preceding picture moves out of the picture field. A toric lens 13 can be inserted in the ray path in front of the picture carrier 6 in order to avoid the influence of the curvature of the film path upon the sharpness, this lens being preferably cemented directly on to the end of the prism 11.

In the arrangement shown in Figs. 3 to 5 color fringes or similar disturbing phenomena may be produced due to the fact that the opposite faces of the stationary prisms 3', 11 and of the revolving prisms 12a, 12b . . . are temporarily at an angle one with respect to the other (see Fig. 4) and consequently enclose an air prism. This defect can be eliminated in the simplest manner, as shown in Fig. 6, by grinding the opposite faces of the said sets of prisms moving opposite to each other cylindrically and concentrically with the optical axis. Between these faces there remains then only a narrow cylindrical gap S. The slight ray displacements occurring within this gap may generally be neglected. In special cases they may be completely eliminated by filling gap S with a liquid, the refraction index of which corresponds to that of glass. In order to prevent undesirable eddy formations in the interior of gap S round bodies 14 of glass or metal may be cemented on to the prisms 3', 11, as shown in Fig. 6, said bodies completing the gap S to a uniform ring-shaped cross-section around the whole circumference. This measure is advisable also if gap S remains as air gap, because it considerably improves the noiseless operation of the compensator.

As can be seen the ray path extends in the last described form of construction from the lens, which is directly in front of the first diverting prism 3 up to the toric last lens 13 or in inverse direction exclusively through glass. If its geometrical length on this path amounts for instance to 30 mm. this corresponds to a length of air path of about 18 to 20 mm. This proves, that the optical compensation according to the invention can be applied down to focal distances of 35 mm. or even of 30 mm. This aim is attained exclusively with the aid of uniformly revolving optical elements, namely elements which practically work noiseless and can be employed up to very high picture change frequencies.

It is evident that all measures according to the invention may be employed according to the principle of the reversibility of every ray path in a similar manner for cameras as well as for projectors. Instead of a film a roll or the like may serve as picture carrier. In all these instances apparatus are produced according to the invention which, as regards simplicity are not inferior to the optical compensation with prism wheel which up to the present was considered as the simplest one and which, compared with the prism wheel, possess the decisive advantage that the length of the light path does not alter during the moving after of the picture.

I claim:

1. In cinematographic apparatus of the continuously moving film type, a lens, an arcuate film guide, a first stationary deflecting member adjacent to said lens to deflect a beam of light passing through said lens substantially at a right angle to the optical axis of said lens, a movable deflecting system comprising a plurality of deflecting elements mounted in circular formation and arranged to revolve about the lens axis, each of said deflecting elements adapted to further deflect said beam in a direction parallel to the lens axis and back to cross the lens axis at a right angle, whereby the deflected portion of said beam oscillates about the lens axis during rotation of said system, and a second stationary reflecting member located at the intersection point of the deflected beam with the lens axis to return the beam into a direction coincident with the lens axis and to impinge it unto said film guide, the center of the arc formed by said film guide coinciding with said intersection point.

2. In cinematographic apparatus of the continuously moving film type, a lens, an arcuate film guide, a first stationary right-angled isosceles prism adjacent to said lens to deflect a beam of light passing through said lens substantially at a right angle to the optical lens axis, a movable deflecting system comprising a plurality of right-angled isosceles prism elements mounted adjacent to each other in circular formation and arranged to revolve about said lens axis, each of said prism elements adapted to further deflect said beam in a direction parallel to the lens axis and back to cross the lens axis at a right angle, a second stationary right angle isosceles prism located at the intersection point of the deflected beam with the lens axis and adapted to return the beam into a direction coincident with the lens axis and to impinge it unto said film guide, the center of the arc formed by said film guide coinciding with said intersection point.

3. An arrangement as claimed in claim 2 including a toric lens arranged between said second stationary prism and said film guide.

4. An arrangement as claimed in claim 2, wherein the opposing surfaces of said stationary prisms and said revolving prism elements moving relative to each other are of concave and convex cylindrical shape with respect to the lens axis to provide a gap of constant width therebetween.

5. An arrangement as claimed in claim 2, wherein the opposing faces of said stationary prisms and said revolving prism elements moving relative to each other are of concave and convex cylindrical shape with respect to the lens axis, and further cylindrically shaped extension members projecting from the remaining faces of said stationary prisms to provide a continuous annular gap of constant width between the stationary and revolving prism elements.

6. An arrangement as claimed in claim 2, wherein the opposing faces of said stationary prisms and said revolving prism elements moving relative to each other are of concave and convex cylindrical shape with respect to the lens axis, further cylindrically shaped extension members projecting from the remaining faces of said stationary prisms to provide a continuous annular gap of constant width between the stationary and revolving prism elements, and a substance filling said gap having a refraction index equal to the refraction index of said prisms.

WERNER EISSFELDT.